(12) United States Patent
Kabayama

(10) Patent No.: US 9,884,658 B2
(45) Date of Patent: Feb. 6, 2018

(54) VEHICLE BODY REAR STRUCTURE

(71) Applicant: HONDA MOTOR CO., LTD., Tokyo (JP)

(72) Inventor: Shohei Kabayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/262,497

(22) Filed: Sep. 12, 2016

(65) Prior Publication Data

US 2017/0073019 A1 Mar. 16, 2017

(30) Foreign Application Priority Data

Sep. 14, 2015 (JP) ................. 2015-180952

(51) Int. Cl.
*B62D 25/20* (2006.01)
*B62D 21/15* (2006.01)

(52) U.S. Cl.
CPC ....... *B62D 25/2027* (2013.01); *B62D 21/155* (2013.01)

(58) Field of Classification Search
CPC .... B62D 21/152; B62D 21/155; B62D 25/08; B62D 25/087; B62D 25/2027
USPC ..... 296/187.11, 193.08, 203.04, 204, 187.08
See application file for complete search history.

(56) References Cited

U.S. PATENT DOCUMENTS

| 8,534,748 | B1 * | 9/2013 | Aghssa ................ | B62D 25/087 280/794 |
| 2003/0173799 | A1 * | 9/2003 | Wendland ............ | B62D 21/152 296/187.01 |
| 2007/0205635 | A1 * | 9/2007 | Bunsmann ............ | B62D 25/20 296/204 |
| 2008/0231085 | A1 * | 9/2008 | Westing ................ | B62D 21/06 296/204 |
| 2016/0090124 | A1 * | 3/2016 | Kaneko ................. | B62D 21/11 296/203.04 |
| 2016/0137228 | A1 * | 5/2016 | Atsumi ................. | B62D 21/06 296/204 |
| 2016/0144897 | A1 * | 5/2016 | Cho ...................... | B62D 21/08 296/204 |
| 2016/0207572 | A1 * | 7/2016 | Natsume ............... | B62D 25/20 |
| 2016/0264177 | A1 * | 9/2016 | Kawaguchi ........... | B62D 25/20 |
| 2016/0318555 | A1 * | 11/2016 | Bjekovic ............... | B62D 25/20 |

(Continued)

FOREIGN PATENT DOCUMENTS

| DE | 102013101395 | * 8/2014 | .......... B62D 25/087 |
| JP | 2009-120100 A | 6/2009 | |

OTHER PUBLICATIONS

Computer translation of DE 102013101395A1.*

*Primary Examiner* — Gregory Blankenship
(74) *Attorney, Agent, or Firm* — Westerman, Hattori, Daniels & Adrian, LLP

(57) ABSTRACT

A vehicle body rear structure includes a floor brace extending outward in a vehicle width direction in an inclined manner from a front floor, and a rear brace extending inward in the vehicle width direction in an inclined manner from a rear end portion of the floor brace. A rear end portion of the rear brace is connected with a support bracket. A front end portion of the rear brace and the rear end portion of the floor brace are connected with a left rear frame via a connecting member. The floor brace and the rear brace are arranged in a substantially V-shape in plan view.

19 Claims, 15 Drawing Sheets

(56) References Cited

U.S. PATENT DOCUMENTS

2017/0073019 A1* 3/2017 Kabayama ......... B62D 25/2027
2017/0106914 A1* 4/2017 Abe ..................... B62D 21/157

* cited by examiner

VEHICLE BODY REAR STRUCTURE

CROSS REFERENCES TO RELATED APPLICATIONS

The present application claims priority under 35 U.S.C. § 119 to Japanese Patent Application No. 2015-180952, filed Sep. 14, 2015, entitled "Vehicle Body Rear Structure." The contents of this application are incorporated herein by reference in their entirety.

TECHNICAL FIELD

The present disclosure relates to a vehicle body rear structure in which a left rear frame and a right rear frame are arranged outward in the vehicle width direction and a brace is connected with each rear frame for reinforcement.

BACKGROUND

Some vehicle body rear structures, in which a left inclined brace extends in an inclined manner to a left rear frame and a rear cross member, and a right inclined brace extends in an inclined manner to a right rear frame and a rear cross member such that the inclined braces are arranged in a substantially V-shape, have been known.

Further, a left brace and a right brace are arranged inward of the vehicle width direction of each inclined brace. To be more specific, the left brace extends to the left rear frame and a left floor frame. Also, the right brace extends to the right rear frame and a right floor frame.

According to this vehicle body rear structure, as the left and right inclined braces and the left and right braces are arranged, the rigidity of the vehicle body rear structure with respect to the torsion will be secured by the braces (see Japanese Unexamined Patent Application Publication No. 2009-120100, for example).

However, according to the vehicle body rear structure of Japanese Unexamined Patent Application Publication No. 2009-120100, a front end portion of the left inclined brace and a rear end portion of the left brace are connected with an interval therebetween in the front and back direction of the vehicle body. Accordingly, when an impact load is inputted to the vehicle body rear structure from the rear of the vehicle body, the inputted impact load will be inputted in an inclined manner to the left rear frame via the left inclined brace from the rear cross member.

From the impact load inputted in the inclined manner a bending moment will be generated to the left rear frame due to the component force in the vehicle width direction. In the similar manner as the left rear frame, a bending moment will be generated to the right rear frame due to the component force in the vehicle width direction.

Therefore, the vehicle body rear structure according to Japanese Unexamined Patent Application Publication No. 2009-120100 will have a difficulty in securing the rigidity against the impact load that is inputted from the rear of the vehicle body, which leaves room for improvement.

SUMMARY

The present disclosure provides, for example, a vehicle body rear structure operable to secure the rigidity thereof by suppressing the bending moment from being applied to the rear frame.

The first aspect of the embodiments provides a vehicle body rear structure including a left rear frame and a right rear frame arranged outward in a vehicle width direction and extending in a front and back direction of the vehicle body, a front floor arranged frontward of each rear frame having, and a rear support portion arranged rearward of the front floor and between the left rear frame and the right rear frame, the vehicle body rear structure includes a left floor brace and right floor brace each having a front end portion connected to the front floor, and each extending rearward of the vehicle body in an inclined manner outwardly in the vehicle width direction, the vehicle body rear structure includes a left rear brace and a right rear brace each extending rearward of the vehicle body and inward in the vehicle width direction in an inclined manner from a rear end portion of the floor brace, and each having a rear end portion connected with the rear support portion, the front end portion of the rear brace is connected with the rear end portion of the floor brace directly or with a connecting member, and the floor brace and the rear brace are arranged to make a substantially V-shape when seen in plan view.

As described above, the floor brace extends rearward of the vehicle body from the front floor and outward in the vehicle width direction in an inclined manner. Also, the rear brace extends rearward of the vehicle body from the rear end portion of the floor brace and inward in the vehicle width direction in an inclined manner. Further, the front end portion of the rear brace and the rear end portion of the floor brace are connected with the rear frame such that the floor frame and the rear frame are arranged in a substantially V-shape when seen in plan view.

In this state, when an impact load is inputted to the vehicle body rear structure from the rear of the vehicle body, the inputted impact load is inputted to the floor brace via the rear brace from the rear end portion of the rear brace. Accordingly, a component force directed outwardly in the vehicle width direction (i.e., an outwardly directed component force) is applied to the rear frame from the rear brace. Meanwhile, a component force directed inwardly in the vehicle width direction (i.e., an inwardly directed component force) is applied to the rear frame from the floor brace.

Here, the outwardly directed component force and the inwardly directed component force are applied to the same area of the rear frame in the vehicle body direction. Thus, a bending moment applied to the rear frame by the outwardly directed component force and a bending moment applied to the rear frame by the inwardly directed component force offset one another.

By this, it becomes possible to prevent a bending moment from being applied to the rear frame, thereby securing the rigidity of the rear frame (i.e., the vehicle body rear structure) against the impact load.

Also, the floor brace extends in an inclined manner from the front floor, while the rear end portion of the floor brace is connected with the rear frame. Accordingly, the front floor is connected with the rear frame via the floor brace. Here, the rear frame includes a member having high rigidity forming the vehicle body frame work.

Thus, the front floor is reinforced by the rear frame. By this, the rigidity of the front floor is enhanced, thereby improving the riding comfort for the passenger of the vehicle.

According to the second aspect of the embodiments, the vehicle body rear structure preferably includes a left floor frame and a right floor frame each arranged at a lower surface of the front floor and including a closed cross section with the front floor, and each extending in a front and back direction of the vehicle body, and the front end portion of the floor brace is connected with the front floor and the floor frame.

As described above, the floor frame extends in the front and back direction of the vehicle body and is provided to the lower surface of the front floor, and the floor frame and the front floor form a closed cross section. Thus, the rigidity of the floor frame and the front floor will be enhanced. Further, the floor brace is connected with the floor frame and the front floor which form the closed cross section.

Accordingly, the floor frame and the front floor that form the closed cross section are operable to enhance the rigidity of the floor brace, thereby securing the rigidity of the vehicle body rear structure.

According to the third aspect of the embodiments, the rear support portion preferably includes a closed cross section.

Here, the rear end portion of the rear brace is connected with the rear support portion. The rear support portion includes a closed cross section. Accordingly, the rigidity of the rear support portion is enhanced. Since the rigidity of the rear brace is enhanced by the rear support portion having enhanced rigidity, the rigidity of the vehicle body rear structure is secured.

According to the fourth aspect of the embodiments, the connecting member preferably includes a brace connecting portion configured to connect the floor brace with the rear brace to include a substantially V-shape when seen in plan view, and a frame connecting portion connected with the rear frame.

As described above, the floor brace and the rear brace are connected via the brace connecting portion of the connecting member in a substantially V-shape. Accordingly, the floor brace and the rear brace are securely connected by the brace connecting portion. By this, the rigidity of the floor brace and the rear brace will be enhanced, thereby securing the rigidity of the vehicle body rear structure.

Here, the rear frame is arranged at a lower portion of the vehicle body rear structure. Accordingly, when the floor brace and the rear brace are individually connected with the rear frame, it would be time consuming to connect each brace.

Thus, according to the fourth aspect, the brace connecting portion and the frame connecting portion are provided for the connecting member. Accordingly, this configuration enables the frame connecting portion to be connected with the rear frame while the floor brace and the rear brace are connected with the brace connecting portion.

By this, it becomes possible to simplify the manufacturing process compared to a process in which the floor brace and the rear brace are individually connected with the rear frame.

According to the fifth aspect, the connecting member preferably further includes a leg portion arranged between the brace connecting portion and the frame connecting portion, and extending in a vertical direction.

As described above, the connecting member includes the leg portion which is arranged between the brace connecting portion and the frame connecting portion while the leg portion extends in the vertical direction. Accordingly, the vertical height of the brace connecting portion and the frame connecting portion can be differentiated.

By this, it becomes possible to differentiate the vertical height of the floor brace and the rear brace with respect to the rear frame, thereby enhancing the degree of design freedom in terms of determining the vertical position of the floor brace and the rear brace.

Also, since the leg portion which extends in the vertical direction is arranged between the brace connecting portion and the frame connecting portion, the connecting member may include a substantially crank-shape cross section. By this, the rigidity of the connecting member is enhanced.

By connecting the floor brace and the rear brace with the connecting member having high rigidity, the rigidity of the floor brace and the rear brace will be secured.

According to the sixth aspect, the brace connecting portion preferably includes an upper brace connecting portion arranged above the floor brace and the rear brace, a lower brace connecting portion arranged below the floor brace and the rear brace, and the upper brace connecting portion and the lower brace connecting portion hold to connect the floor brace and the rear brace in the vertical direction.

As described above, the brace connecting portion includes the upper brace connecting portion and the lower brace connecting portion. Also, the floor brace and the rear brace are fitted in the vertical direction by the upper brace connecting portion and the lower brace connecting portion.

By this, the floor brace and the rear brace are securely supported by the brace connecting portion, thereby enhancing the rigidity of each brace.

According to the seventh aspect, the vehicle body rear structure preferably further includes a sub frame having a front attachment portion and a rear attachment portion attached to a bottom portion of the rear frame, and the connecting member is arranged near the front attachment portion of the sub frame.

As described above, the front attachment portion is attached at the bottom portion of the rear frame, and the connecting member is connected near the front attachment portion. Accordingly, a load that is inputted to the bottom portion of the rear frame from the front attachment portion of the sub frame is transmitted to the connecting member, and the load transmitted to the connecting member is effectively dispersed to the floor brace and the rear brace.

By this, the load that is inputted to the bottom portion of the rear frame from the front attachment portion of the sub frame is supported by the floor brace and the rear brace, thereby enhancing the rigidity of the vehicle body rear structure.

According to the eighth aspect, the vehicle body rear structure preferably further includes a rear cross member connected with the rear attachment portion of the sub frame, and extending in the vehicle width direction, and the vehicle body rear structure further includes an article storing floor connected with the rear cross member at a central portion in the vehicle width direction, and the rear cross member or a support bracket arranged at the rear cross member form the rear support portion.

As described above, the rear attachment portion of the sub frame is connected with the rear cross member, and the vehicle width direction central portion of the rear cross member is jointed with the article storing floor. By this, the article storing floor is reinforced by the rear cross member, and the rigidity of the article storing floor is secured.

Further, the rear support portion is created by the rear cross member or the support bracket arranged at the rear cross member. The rear support portion includes a member to connect the rear brace. Also, the rear attachment portion of the sub frame is connected with the rear cross member. The load that is inputted from the rear attachment portion of the sub frame to the rear cross member is effectively dispersed.

By this, the load that is inputted from the rear attachment portion of the sub frame to the rear cross member is supported by the rear brace, thereby enhancing the rigidity of the vehicle body rear structure.

According to the ninth aspect, the rear frame preferably includes at a bottom portion thereof a vehicle lifting portion configured to support a lifting force applied to the vehicle body, and the frame connecting portion is located in ward of the vehicle lifting portion in the vehicle width direction.

As described above, the vehicle lifting portion is arranged at the bottom portion of the rear frame so as to allow the vehicle lifting portion to support the lifting force applied to the vehicle body. Also, the frame connecting portion (i.e., the connecting member) is arranged inward in the vehicle width direction of the vehicle lifting portion. Accordingly, a lifter may be arranged at the vehicle lifting portion without interfering with the connecting member.

For example, the present disclosure is operable, when an impact load is inputted to a rear frame, to suppress the impact load inputted to the rear frame from generating a bending moment and secure the rigidity of the vehicle body rear structure.

DETAILED DESCRIPTION

An embodiment will be described below with reference to accompanying drawings. Note that words such as "front (Fr)," "rear (Rr)," "left (L)" and "right (R)" indicate the directions as seen from the operator of the vehicle.

Embodiment

A vehicle body rear structure 10 in accordance with the present embodiment will be described.

Figure 1:
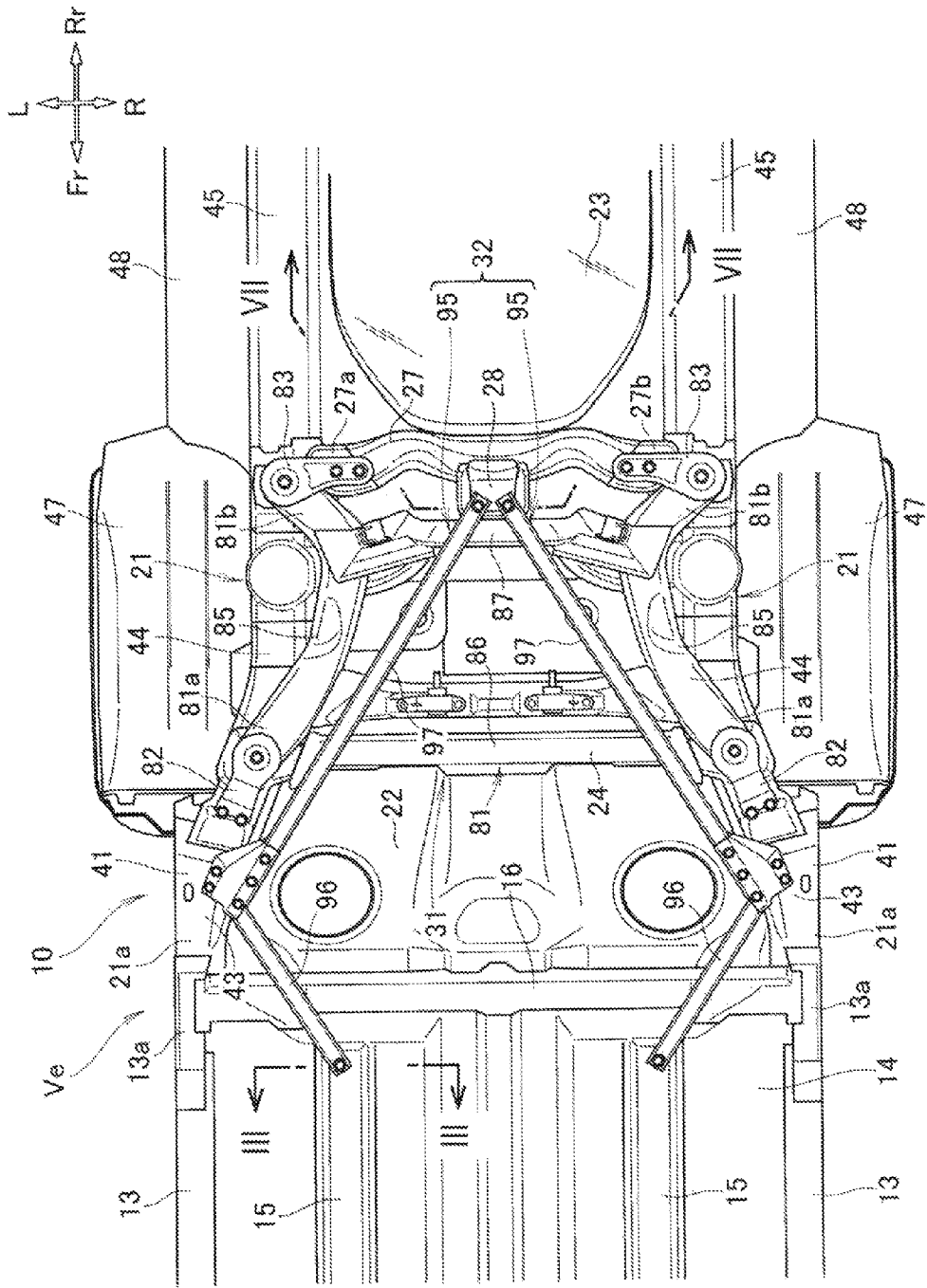
FIG. 1 is a bottom view illustrating a vehicle body rear structure according to an embodiment of the present disclosure.
Figure 2:
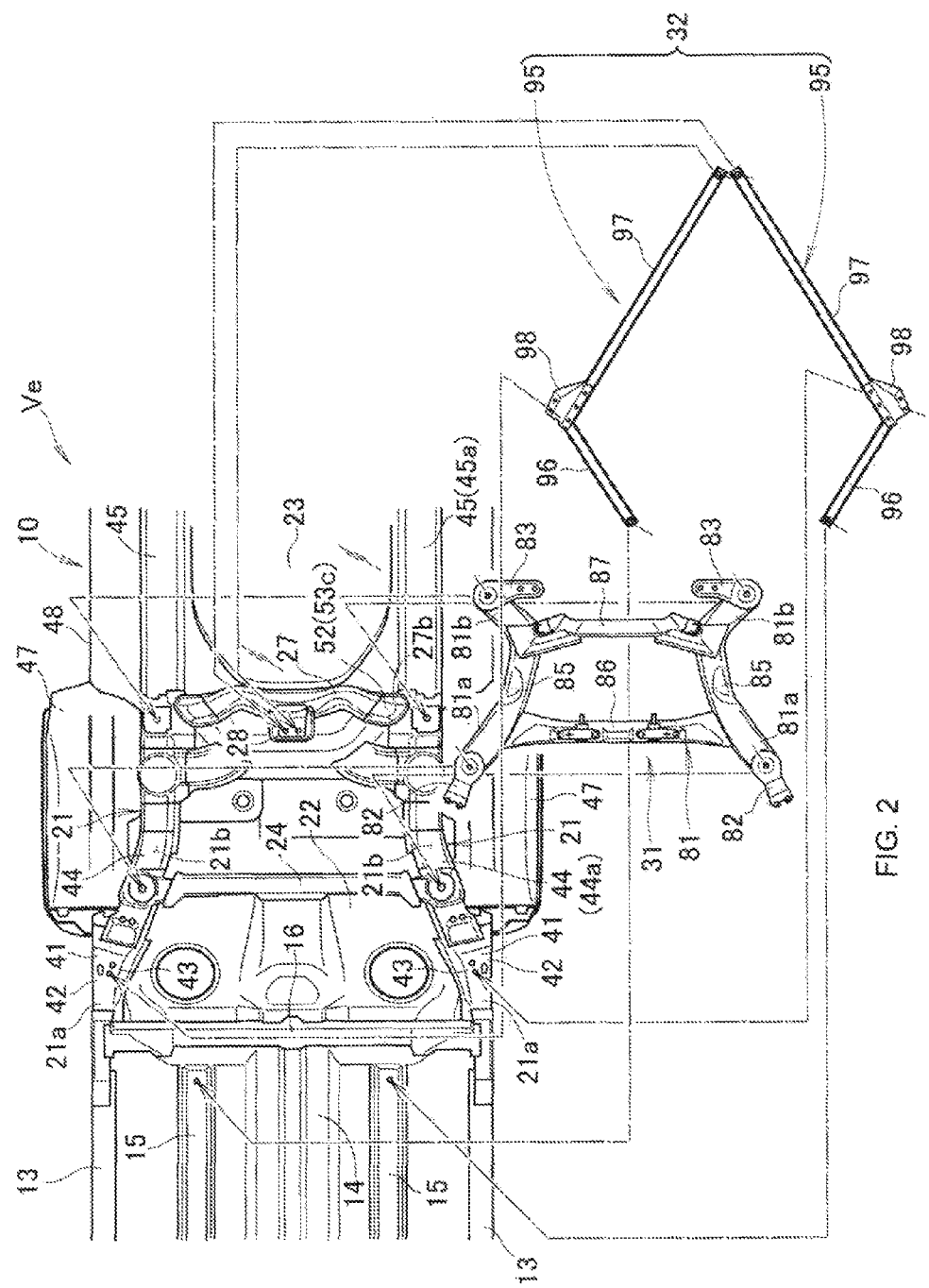
FIG. 2 is an exploded view illustrating the vehicle body rear structure illustrated in FIG. 1

As illustrated in FIG. 1 and FIG. 2, the vehicle body rear structure 10 includes a portion constituting a rear portion of a vehicle Ve. The vehicle body rear structure 10 includes a left side sill 13 and a right side sill 13 arranged at the left and right outer side of the central portion in the vehicle longitudinal direction, a front floor 14 arranged between each side sill 13, a left floor frame 15 and a right floor frame 15 arranged respectively on the left and right side of the front floor 14, and a front floor cross member 16 arranged to bridge a rear end portion 13a of the left side sill 13 and the rear end portion 13a of the right side sill 13.

Also, the vehicle body rear structure 10 includes a left rear frame 21 extending rearward of the vehicle Ve from the left side sill 13, a right rear frame 21 extending rearward of the vehicle Ve from the right side sill 13, a rear floor 22 arranged between the left rear frame 21 and the right rear frame 21, an article storing floor (tire pan) 23 arranged in the rear of the rear floor 22, and a rear floor cross member 24 arranged substantially at the center between the article storing floor 23 and the front floor cross member 16.

Further, the vehicle body rear structure 10 includes a rear cross member 27 arranged rearward of the rear floor cross member 24, a rear support portion 28 arranged centrally in a vehicle width direction of the rear cross member 27, a sub frame 31 arranged below of the left rear frame 21 and the right rear frame 21, and a brace means 32 arranged below of the sub frame 31.

The rear support portion 28 includes a member that is arranged rearward of the vehicle body, and hereinafter will be referred to as a "support bracket 28."

Note that the vehicle body rear structure 10 includes a substantially symmetric configuration. Accordingly, members on the left side and those on the right side of the vehicle body rear structure 10 will be given the same reference numerals, and the description will be made on the members on the left side, while the description on the members on the right side will be omitted.

The left side sill 13, which is arranged centrally in a front and back direction of the vehicle body and on the left and outer side in the vehicle width direction, extends in the front and back direction of the vehicle body and includes a highly rigid member constituting a frame work of the vehicle body.

The front floor 14 is arranged between the left side sill 13 and the right side sill 13, and includes a floor panel forming a floor portion of the front portion of the vehicle body. In other words, the front floor 14 is arranged at the front of the vehicle body between the left rear frame 21 and the right rear frame 21.

Figure 3:
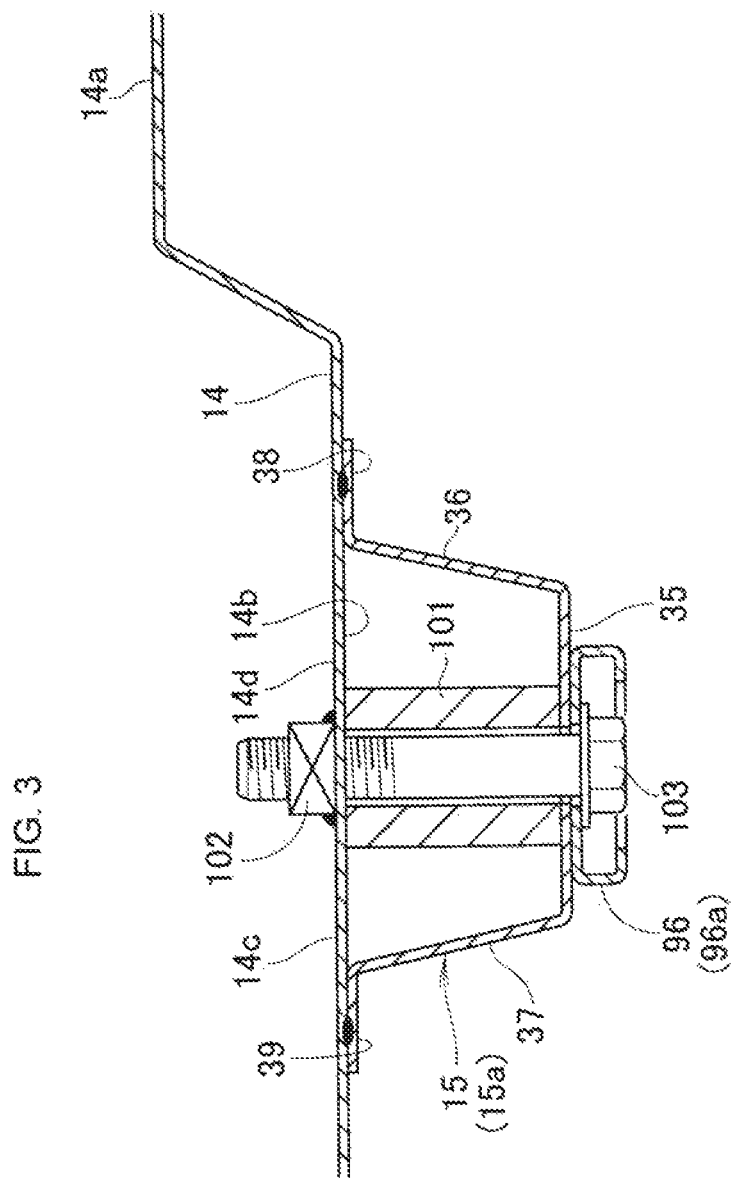
FIG. 3 is a III-III cross sectional view of FIG. 1

As illustrated in FIG. 3, the left front frame 15 is arranged at the left side of a vehicle width central 14a at the front floor 14 and at a lower surface 14b of the front floor 14. The left front frame 15 extends in the front back direction of the vehicle body, and includes a bottom portion 35, an interior wall 36, an exterior wall 37, an interior flange 38, and an exterior flange 39.

The bottom portion 35 is arranged at an interval in a vertical direction below the lower surface 14b of the front floor 14. The interior wall 36 bends upward from the inner surface of the bottom portion 35 to the lower surface 14b. The exterior wall 37 bends upward from the outer surface of the bottom portion 35 to the lower surface 14b.

The internal flange 38 extends inward in the vehicle width direction from the upper side of the interior wall 36. The exterior flange 39 extends outward in the vehicle width direction from the upper side of the exterior wall 37.

The left floor frame 15 with the interior wall 36, the exterior wall 37, the interior flange 38 and the exterior flange 39 include a substantially hat-shaped cross section. The interior flange 38 and the exterior flange 39 are joined by welding with the lower surface 14b of the front floor 14.

By this, a closed cross section is formed with the front floor 14 and the left front frame 15.

Also, as illustrated in FIG. 1, the front floor cross member 16 is arranged in the vehicle width direction to bridge the rear end portion 13a of the left side sill 13 with the rear end portion 13a of the right side sill 13. The front floor cross member 16 is connected with the front floor 14 to form a closed cross section.

Figure 4:
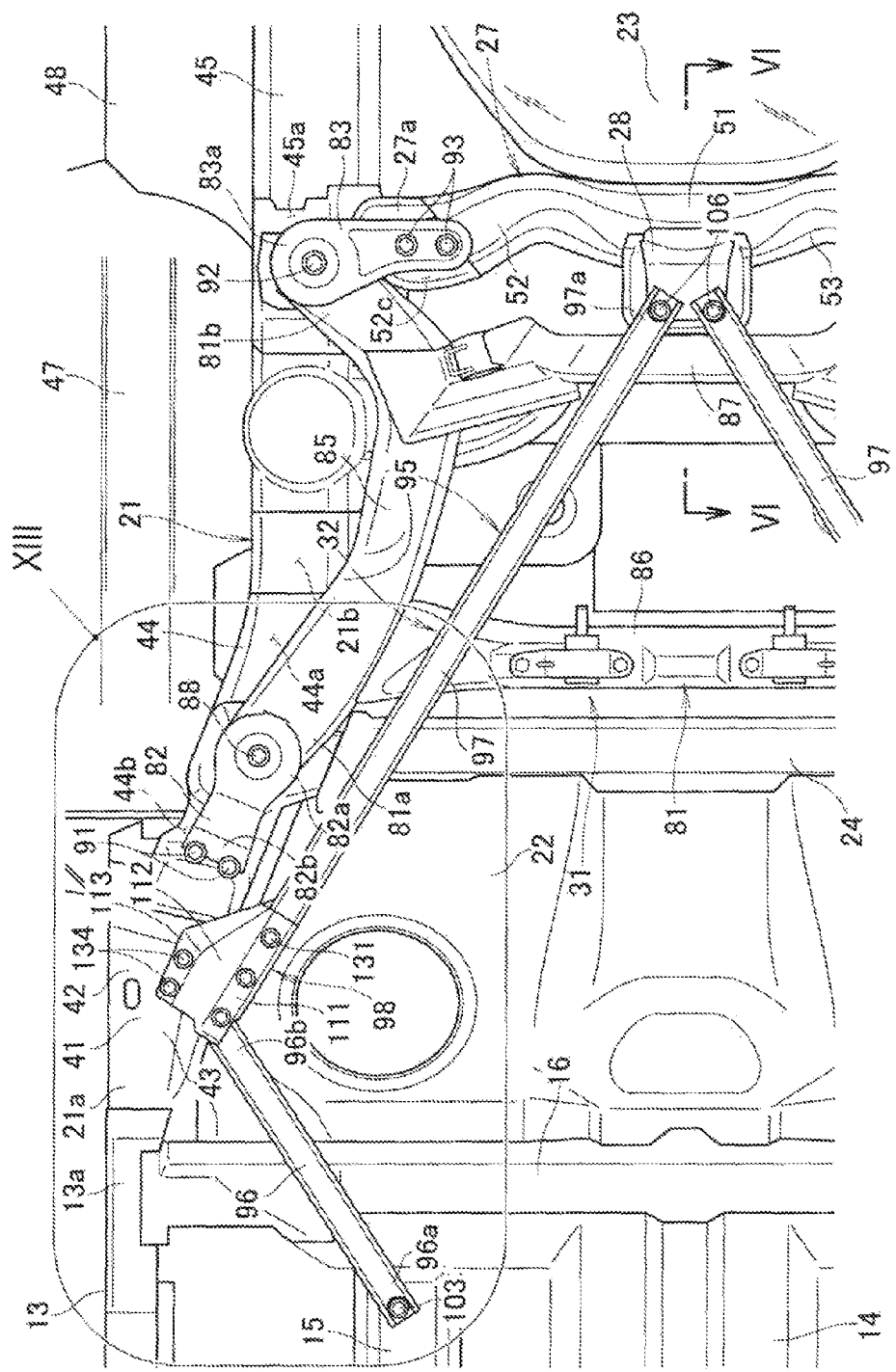
FIG. 4 is an enlarged view illustrating a left side portion of the vehicle body rear structure illustrated in FIG. 1.

As illustrated in FIG. 2 and FIG. 4, the left rear frame 21 extends rearward of the vehicle body from the left side sill 13. The left rear frame 21, which includes a substantially rectangular cross section and is arranged at the left and outer side in the vehicle width direction in the rear portion of the vehicle body in the front and back direction, includes a highly rigid member constituting the frame work of the vehicle body.

The left rear frame 21 includes a front bottom portion 41 forming the bottom portion of a front end portion 21a, a vehicle body lifting portion 42 and a brace support portion 43 arranged at the front bottom portion 41, a frame curved portion 44 extending rearward of the vehicle body from the vehicle body lifting portion 42 and the brace support portion 43, and a frame rear half portion 45 extending rearward of the vehicle body from the frame curved portion 44.

The vehicle body lifting portion 42 is arranged at an outer side in the vehicle width direction of the front bottom portion 41, while the brace support portion 43 is arranged at an inner side in the vehicle width direction of the front bottom portion 41.

The vehicle body lifting portion 42 includes a portion which will be pressed from below by a lifter (vehicle lifting means) during a manufacturing process. As the vehicle body lifting portion 42 is pressed upward from below by the lifter, the lifting force of the vehicle body is applied to the vehicle body lifting portion 42. As the vehicle body lifting portion 42 supports the lifting force, the vehicle body is lifted by the lifter.

The brace support portion 43 is arranged at an inner side in the vehicle width direction of the vehicle body lifting portion 42. A frame connecting portion 113 of a connecting member 98, which will be described below, is arranged at the brace support portion 43.

Also, a left rear wheelhouse 47 is arranged at an outer side in the vehicle direction of the frame curved portion 44 of the left rear frame 21. Also, a left side panel 48 is arranged rearward of the left rear wheelhouse 47.

In a similar manner, a right rear wheelhouse 47 is arranged at the frame curved portion 44 of the right rear frame 21. Also, a right side panel 48 is arranged rearward of the left rear wheelhouse 47.

The rear frame 22, which is arranged rearward of the front floor 14, is arranged between the left rear frame 21 and the right rear frame 21. The rear frame 22 includes a floor panel forming a floor portion in the rear portion of the vehicle body. The article storing floor 23 is arranged to include a convex shape protruding downward so as to form a concave shape on a compartment side of the vehicle body. The article storing floor 23 may be used to store a spare wheel, tools or equipment for repairing a wheel, or the like.

The rear floor cross member 24 is arranged substantially centrally between the article storing floor 23 and the front floor cross member 16. To be more specific, the rear floor cross member 24 extends in the vehicle width direction to bridge the left rear frame 21 and the right rear frame 21. The rear floor cross member 24 is connected with the rear floor 22 so as to jointly create a closed cross section.

Figure 5:
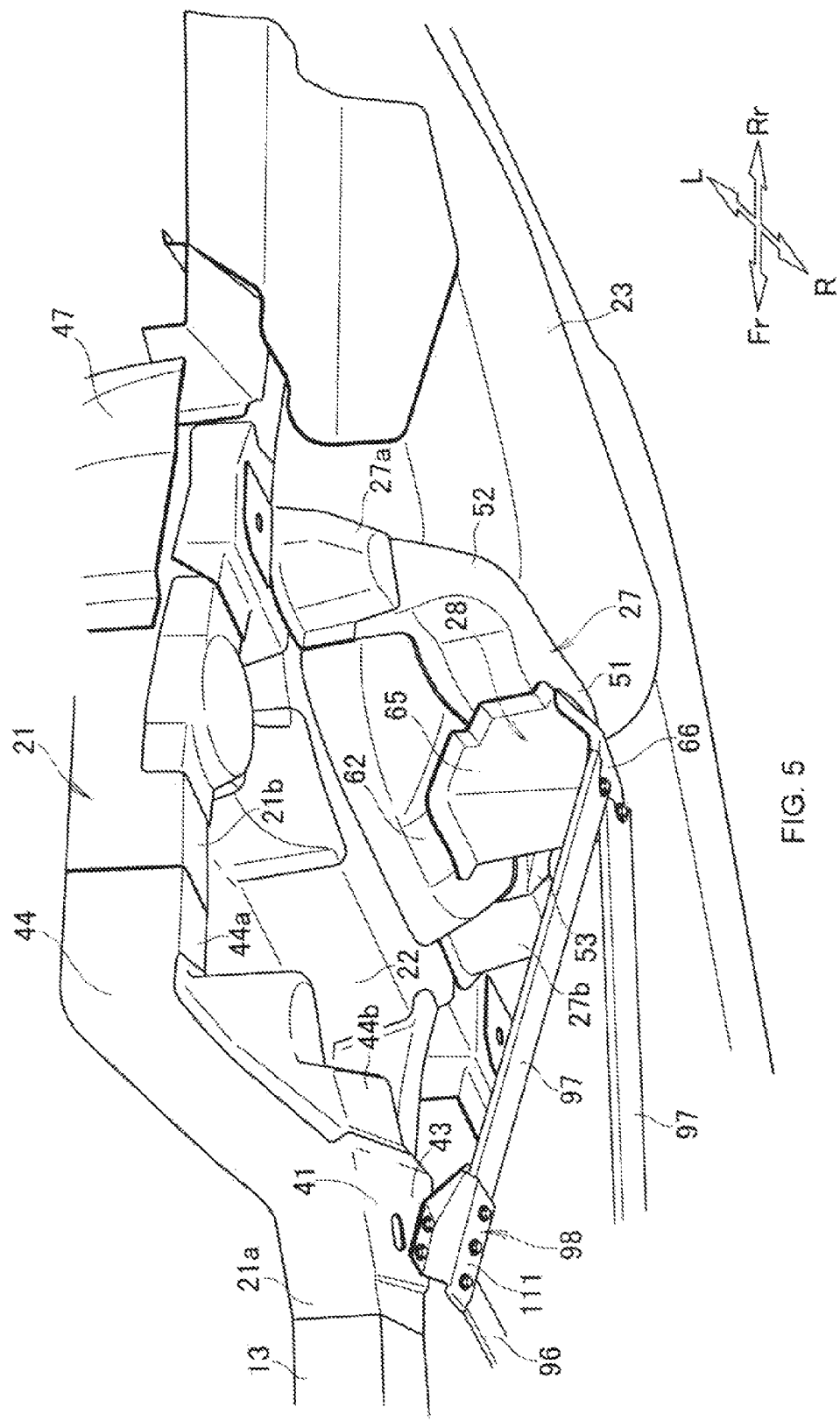
FIG. 5 is a perspective view illustrating the vehicle body rear structure illustrated in FIG. 1 without a sub frame as seen from the front and rear of the vehicle.

As illustrated in FIG. 4 and FIG. 5, the rear cross member 27 is arranged rearward of the rear floor cross member 24. The rear cross member 27 extends in the vehicle width direction to bridge the left rear frame 21 and the right rear frame 21 (see FIG. 2).

A left rear attachment portion 83 of the sub frame 31 (described below) is connected with a left end portion 27a of the rear cross member 27. In the similar manner, a right rear attachment portion 83 (see FIG. 1) of the sub frame 31 is connected with a right end portion 27b of the rear cross member 27.

The rear cross member 27 includes a cross central portion (vehicle width direction central portion) 51 which is arranged at a central portion thereof in the vehicle width direction and at a front and central area of the article storing floor 23, a cross left side portion 52 forming a left side portion of the cross central portion 51, and a cross right side portion 53 forming a right side portion of the cross central portion 51.

Figure 6:
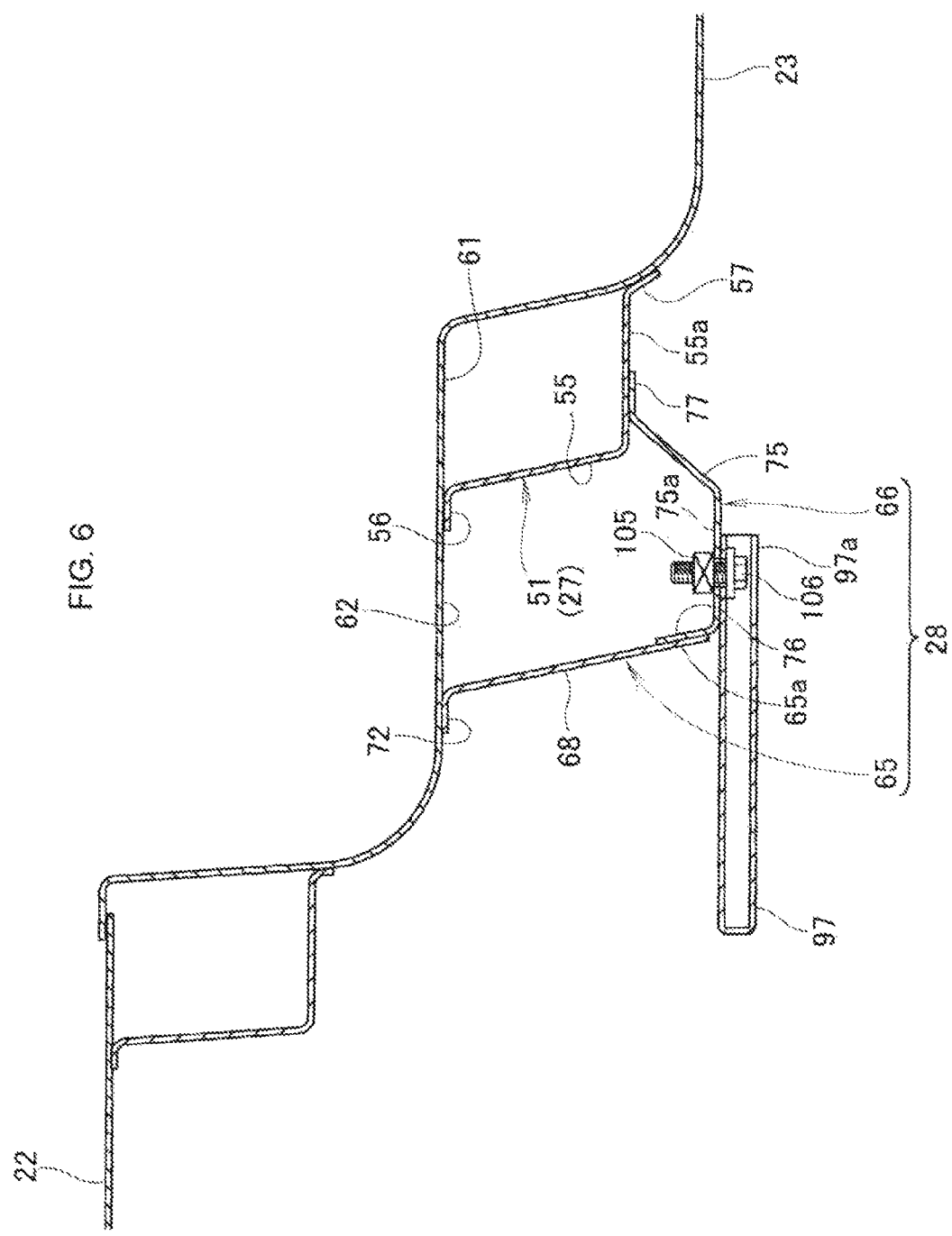
FIG. 6 is a VI-VI cross sectional view of FIG. 4.

As illustrated in FIG. 6, the cross central portion 51 includes a central front portion 55 having a substantially L-shaped cross section, an upper flange 56 which extends frontward of the vehicle body from the upper surface of the central front portion 55, and a rear flange 57 which extends downward from the rear surface of the central front portion 55.

The upper flange 56 and the rear flange 57 are connected with a front step portion 61 of the article storing floor 23. Accordingly, the cross central portion 51 and the front step portion 61 form a closed cross section. Accordingly, the front step portion 61 (i.e., the article storing floor 23) is reinforced by the cross central portion 51, while the rigidity of the article storing floor 23 is secured.

Figure 7:
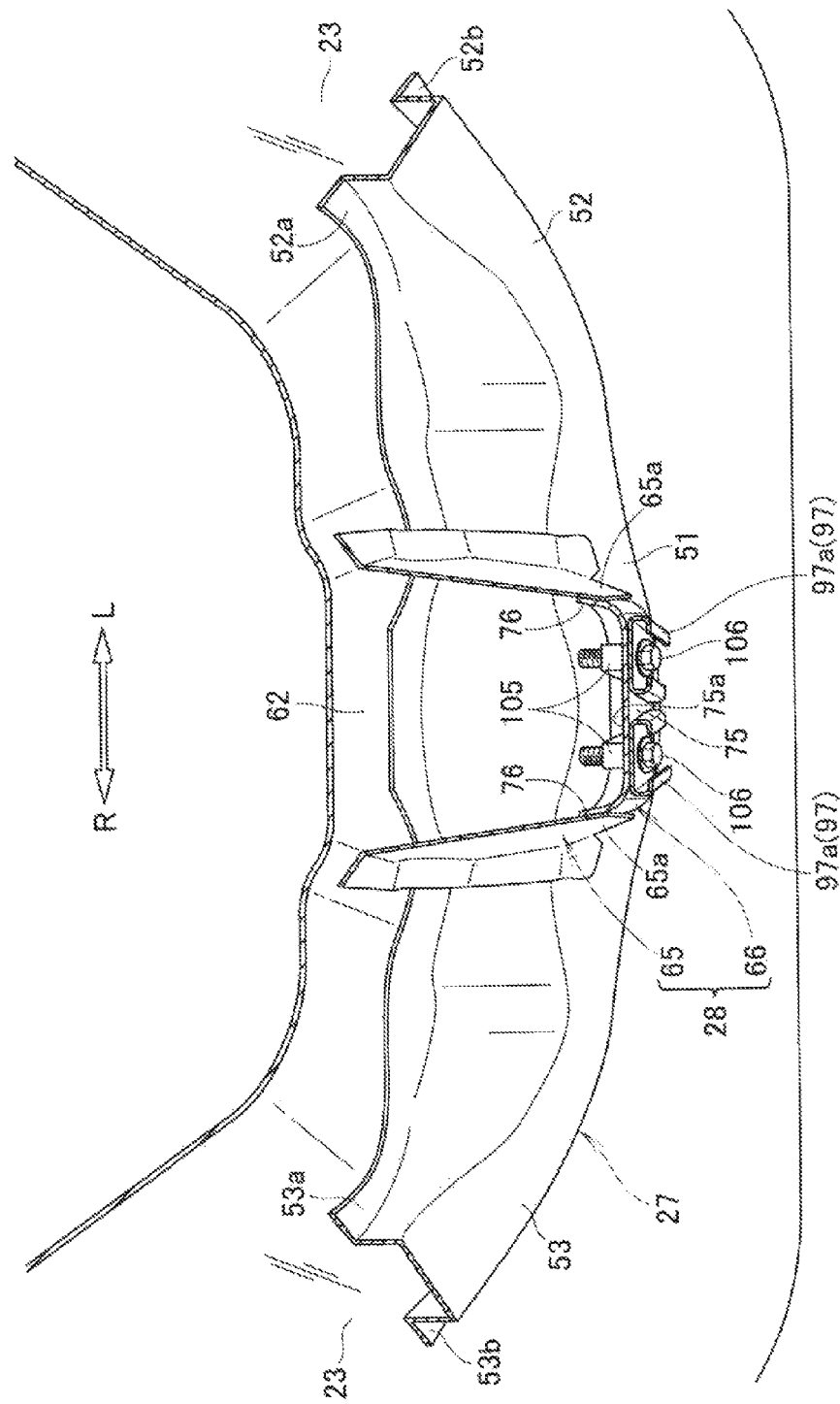
FIG. 7 is a VII-VII cross sectional view of FIG. 1.

Also, as illustrated in FIG. 7, an upper front flange 52a and an upper rear flange 52b of the cross left side portion 52 are connected with the article storing floor 23. Accordingly, the cross left side portion 52 and the article storing floor 23 form a closed cross section.

In a similar manner, an upper front flange 53a and an upper rear flange 53b of the cross right side portion 53 are connected with the article storing floor 23. Accordingly, the cross right side portion 52 and the article storing floor 23 form a closed cross section.

That is to say, the rear floor cross member 24 forms a closed cross section with the article storing floor 23.

Figure 8:
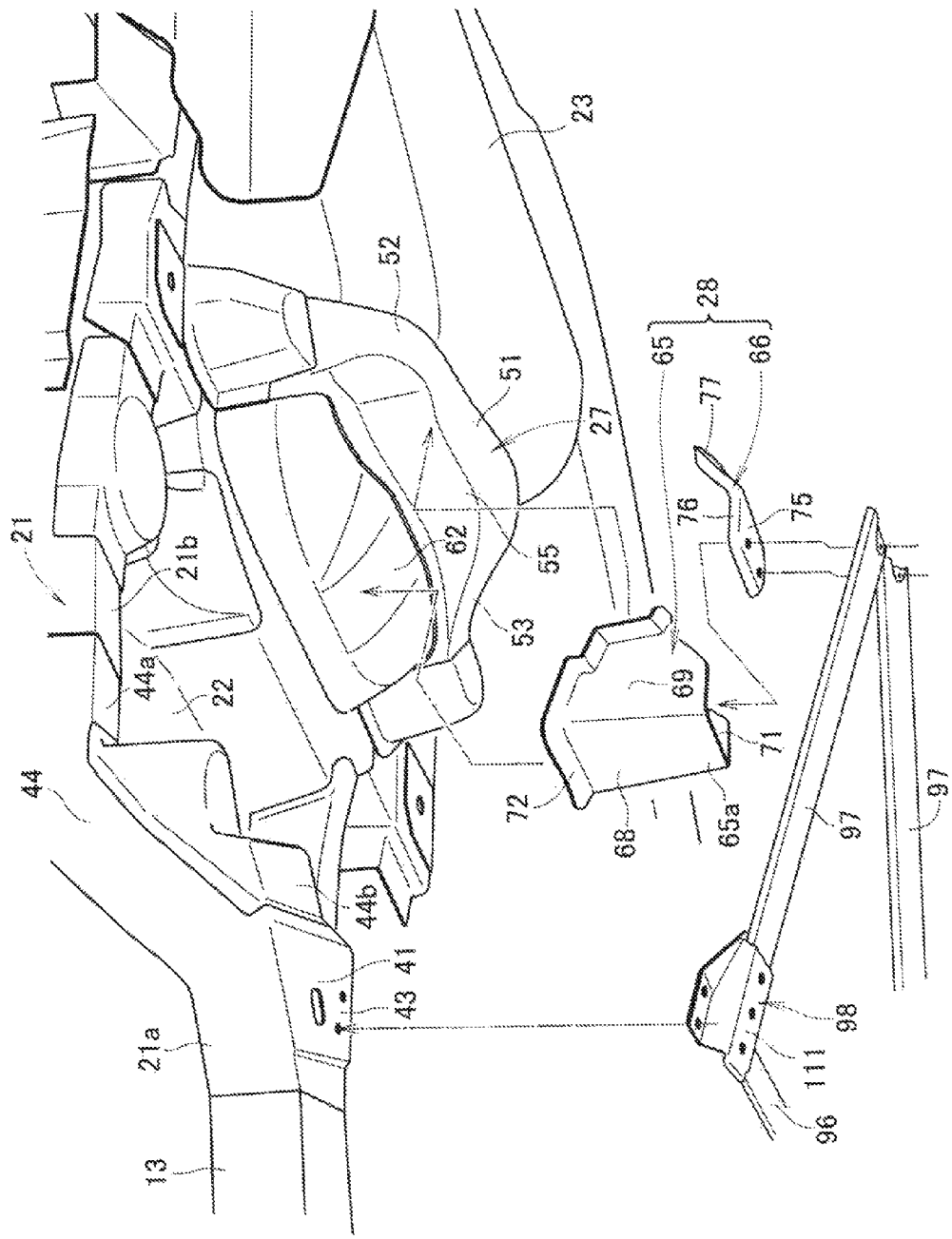
FIG. 8 is an exploded perspective view illustrating the vehicle body rear structure illustrated in FIG. 5.

As illustrated in FIG. 5 and FIG. 8, the support bracket 28 is arranged rearward of the rear floor 22 and between the left rear frame 21 and the right rear frame 21 (see FIG. 1). To be more specific, the support bracket 28 is arranged at the cross central portion 51 of the rear cross member 27.

The support bracket 28 includes a support wall portion 65 which is connected with the cross central portion 51 and a storing front portion 62 of the article storing floor 23, and a support bottom portion 66 which is arranged at a lower end portion 65a of the support wall portion 65.

The support wall portion 65 includes a front wall 68, a left wall 69, a right wall 71 and a support flange 72.

The front wall 68 is arranged anterior to the cross central portion 51. The left wall 69 bends rearward from the left side of the front wall 68. The right wall 71 bends rearward from the right side of the front wall 68. The support flange 72 extends outward of the support wall portion 65 from the top ends of the front wall 68, the left wall 69 and the right wall 71.

The front wall 68, the left wall 69 and the right wall 71 form a substantially U-shaped cross section.

The support flange 72 is connected with the storing front portion 62 of the article storing floor 23 and the central front portion 55 of the cross central portion 51. That is to say, the support wall portion 65 is connected with the storing front portion 62 and the central front portion 55.

The support bottom portion 66 is connected with the lower end portion 65a of the support wall portion 65. The support bottom portion 66 includes a bottom portion 75 which is arranged at the lower end portion 65a of the support wall portion 65, an upper flange 76 which extends upward from the front surface, left surface and right surface of the bottom portion 75, and a rear flange 77 (see also FIG. 6) which extends rearward from the rear surface of the bottom portion 75.

As illustrated in FIG. 6 and FIG. 7, the upper flange 76 is accommodated from below along the lower end portion 65a of the support wall portion 65, and connected with the lower end portion 65a of the upper flange 76. Also, the rear flange 77 is connected with the central front portion 55 of the cross central portion 51 (more specifically, the bottom portion 55a of the central front portion 55).

Accordingly, the lower end portion 65a of the support wall portion 65 is closed by the support bottom portion 66. By this, the support bracket 28 is connected with the cross central portion 51 and the storing front portion 62.

Here, the support wall portion 65 is connected with the storing front portion 62 of the article storing floor 23 and the central front portion 55 of the cross central portion 51. By this, the rear support portion 28, the cross central portion 51 and the storing front portion 62 form a closed cross section. As the rear support portion 28 is arranged at the closed cross section, the rigidity of the rear support portion 28 will be enhanced.

As illustrated in FIG. 2 and FIG. 4, the sub frame 31 is arranged from below at the bottom portions 21 of the left rear frame 21 and the right rear frame 21.

The sub frame 31 includes a frame body 81 having a substantially rectangular shape when seen in plan view, a left front attachment portion (front attachment portion) 82 connected with the left front portion 81a of the frame body 81, a right front attachment portion (front attachment portion) 82 connected with the right front portion 81a of the frame body 81, the left rear attachment portion (rear attachment portion) 83 connected with a left rear portion 81b of the frame body 81, and the right rear attachment portion (rear attachment portion) 83 connected with the right rear portion 81b of the frame body 81.

The frame body 81 includes a left frame 85 which is arranged below the left rear frame 21, a right frame 85 which is arranged below the right rear frame 21, a front member 86 which bridges between the front end portion 81a of the left frame 85 and the front end portion 81a of the right frame 85, and a rear member 87 which bridges between the rear end portion 81b of the left frame 85 and the rear end portion 81b of the right frame 85.

The left frame 85, the right frame 85, the front member 86 and the rear member 87 form a substantially rectangular shape when seen in plan view.

The front end portion 81a of the right frame 85 is fastened via a bolt 88 to a bottom portion 44a of the frame curved portion 44 with the rear end portion 82a of the left attachment portion 82. The bottom portion 44a of the frame curved portion 44 includes a portion forming the frame curved portion 44 for the bottom portion 21b of the left rear frame 21.

In this state, the left front attachment portion 82 extends frontward along the bottom portion 44a of the frame curved portion 44 and outward in the vehicle width direction in an inclined manner. A front end portion 82b of the left front attachment portion 82 is connected with an area that is at the bottom portion 44a of the frame curved portion 44 and rearward of the vehicle body lifting portion 42 and the brace support portion 43 via a plurality of bolts 91.

The front end portion 81a of the right frame 85 and the right front attachment portion 82 are connected with the bottom portion 44a of the frame curved portion 44 of the right rear frame 21 in a similar manner as the front end portion 81a of the left frame 85 and the left front attachment portion 82.

Also, the rear end portion 81b of the left frame 85 is fastened along with an outer end portion 83a of the left rear attachment portion 83 at the bottom portion 45a of the frame rear half portion 45 via a plurality of bolts 92. In this state, the left rear attachment portion 83 extends inward in the vehicle width direction along a bottom portion 52c of the rear cross member 27 (more specifically, the cross left side portion 52).

An inner end portion 83b of the left rear attachment portion 83 is connected with an area that is at the bottom portion 52c of the cross left side portion 52 (i.e., the left end portion 27a of the rear cross member 27) and near the frame latter half portion 45 via a plurality of bolts 93.

The rear end portion 81b of the right frame 85 and the right rear attachment portion 83 are connected with the bottom portion 45a of the frame latter half portion 45 of the right rear frame 21 and the right end portion 27b (bottom portion 53c of the cross right side portion 53) of the rear cross member 27 in the same manner as the rear end portion 81b of the left frame 85 and the left rear attachment portion 83.

By this, the sub frame 31 is attached from below to the bottom portion 21b of the left rear frame 21 and the bottom portion 21b of the right rear frame 21. In this state, a left rear suspension is supported by the left side portion of the sub frame 31, while a right rear suspension is supported by the right side portion of the sub frame 31.

The brace means 32 is arranged below the sub frame 31. The brace means 32 includes a left brace portion 95 which is arranged leftward in the vehicle width direction, and a right brace portion 95 which is arranged rightward in the vehicle width direction.

The left brace portion 95 includes a floor brace 96 which extends rearward of the vehicle body and is inclined outward from the left floor frame 15, a rear brace 97 which extends rearward and is inclined inward from the floor brace 96, and the connecting member 98 which connects the floor brace 96 with the rear brace 97.

Figure 9:
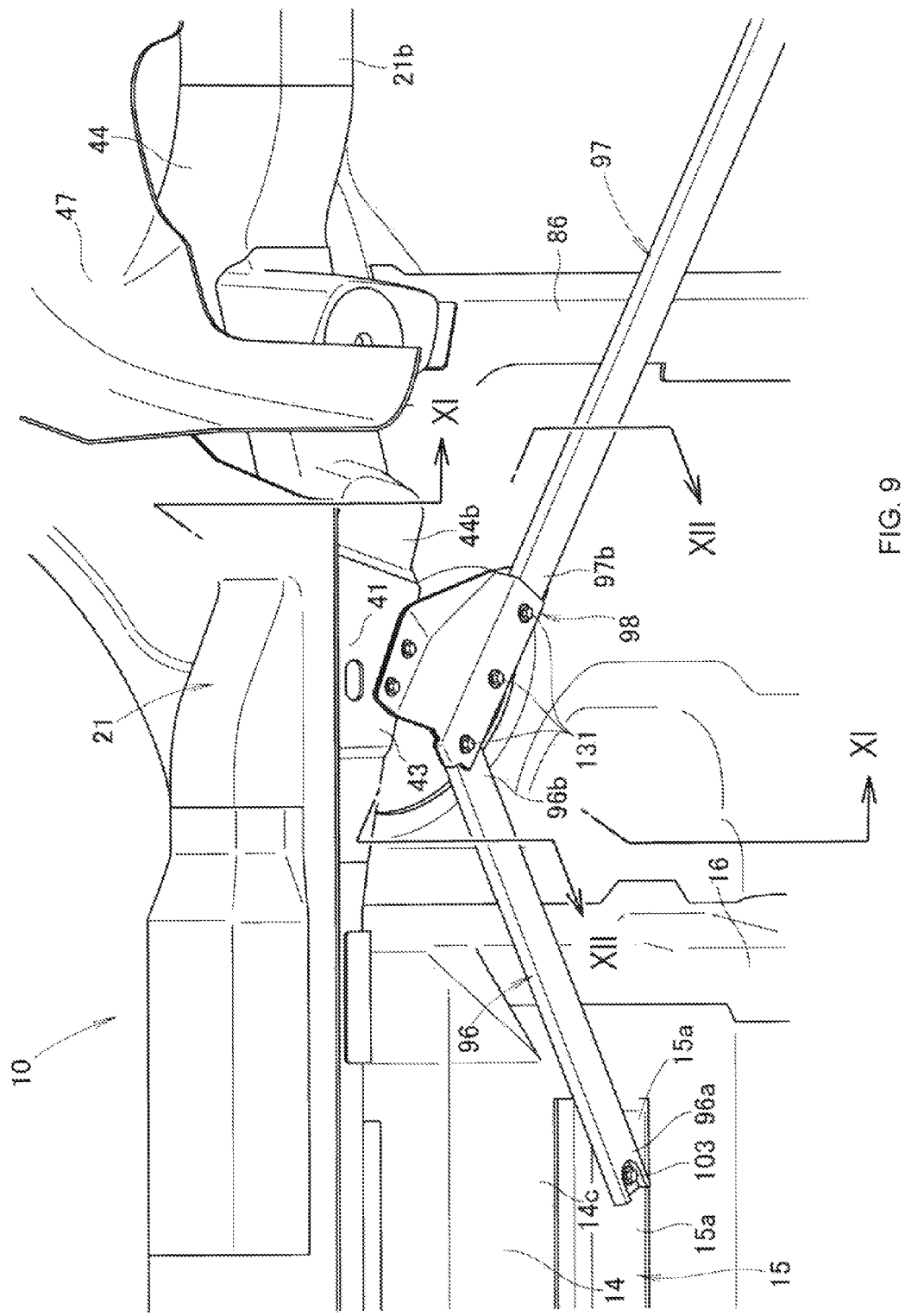
FIG. 9 is a perspective view illustrating the left side portion of vehicle body rear structure illustrated in FIG. 4 without a sub frame.

As illustrated in FIG. 3 and FIG. 9, the floor brace 96 includes a reinforcing member having a substantially rectangular closed cross section. The floor brace 96 is connected with a rear end portion 15a of the left floor frame 15 and a rear end portion 14c of the front floor 14, and extends rearward of the vehicle body and is inclined outward in the vehicle width direction.

Here, the front floor 14 and the left floor frame 15 form a closed cross section. Also, a collar 101 is arranged between the bottom portion 35 of the rear end portion 15a of the left floor frame 15 and the rear end portion 14c of the front floor 14. Further, a nut 102 is welded coaxially with the collar 101 at an upper surface 14d of the front floor 14.

A front end portion 96a of the floor brace 96 is brought into contact from below with the bottom portion 35 of the rear end portion 15a of the left floor frame 15. In this state, a bolt 103 which goes through the front end portion 96a of the floor brace 96 and the bottom portion 35a of the left floor frame 15 is arranged in the color 101. The bolt 101 which goes through the collar protrudes out of the upper surface 14d of the front floor 14 and is connected via the nut 102 by a threaded connection.

By this, the rear end portion 15a of the left floor frame 15 and the rear end portion 14c of the front floor 14 will be connected with the front end portion 96a of the floor brace 96.

Here, the front floor 14 and the left floor frame 15 form a closed cross section. Accordingly, the rigidity of the left floor frame 15 and the front floor 14 will be enhanced. Further, the front end portion 96a of the floor brace 96 is connected with the left floor frame 15 and the front floor 14 which form the closed cross section.

Accordingly, the left floor frame 15 and the front floor 14 which form the closed cross section will enhance the rigidity of the floor brace 96, thereby securing the rigidity of the vehicle body rear structure 10.

Figure 10:
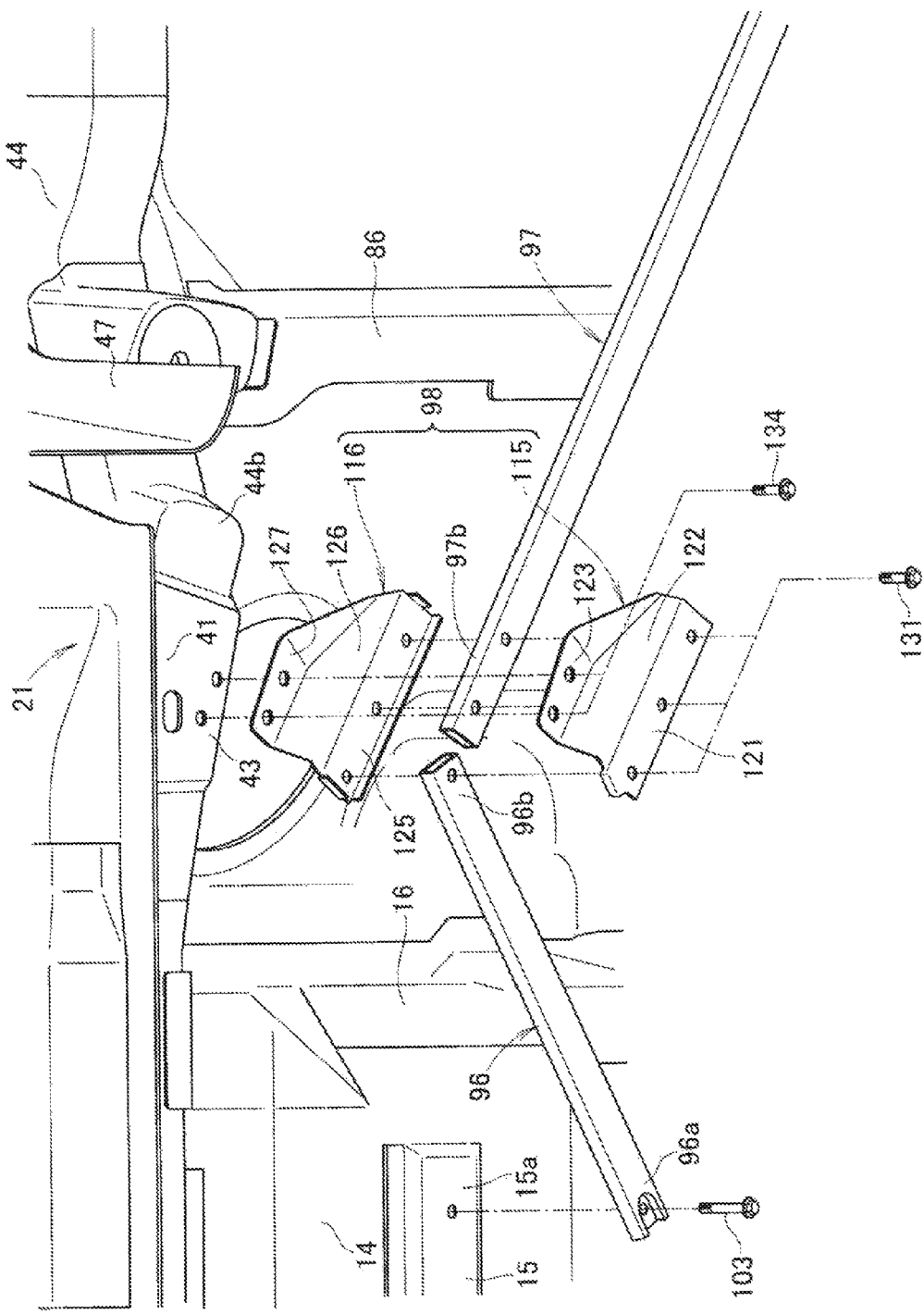
FIG. 10 is an exploded perspective view illustrating the left side portion of the vehicle body rear structure illustrated in FIG. 4.

As illustrated in FIG. 4 and FIG. 10, the rear brace 97 extends from the rear end portion 96b of the floor brace 96 rearward of the vehicle body and is inclined inward in the vehicle width direction. The rear brace 97 includes a reinforcing member having a substantially rectangular closed cross section in a similar manner as the floor brace 96.

As the rear brace 97 extends rearward of the vehicle body and is inclined inward in the vehicle width direction, a rear end portion 97a of the rear brace 97 is connected with the support bracket 28.

To be more specific, as illustrated in FIG. 6 and FIG. 7, the nut 105 is welded at an inner surface 75a of the bottom portion 75 of the support bracket 28 (more specifically, the support bottom portion 66). In this state, the rear end portion 97a of the rear brace 97 is brought into contact from below with the bottom portion 75. The bolt 106 which goes through the rear end portion 97a of the rear brace 97 and the bottom portion 75 is connected with the nut 105 by a threaded connection.

By this, the rear end portion 97a of the rear brace 97 is connected with the support bottom portion 66 of the support bracket 28.

Here, the support bracket 28 is connected with the cross central portion 51 and the storing front portion 62 to create a closed cross section. Accordingly, the rigidity of the support bracket 28 will be enhanced. By this, the rigidity of the rear brace 97 will be improved by the support bracket 28 having enhanced rigidity, thereby securing the rigidity of the vehicle body rear structure 10.

Thus, the floor brace 96 extends outward in the vehicle width direction in an inclined manner, while the rear brace 97 extends inward in the vehicle width direction in an inclined manner. By this, the floor brace 96 and the rear brace 97 are arranged in a substantially V-shape when seen in plan view.

In this state, a rear end portion 96b of the floor brace 96 and a front end portion 97b of the rear brace 97 are connected by the connecting member 98 (see FIG. 10).

Figure 11:
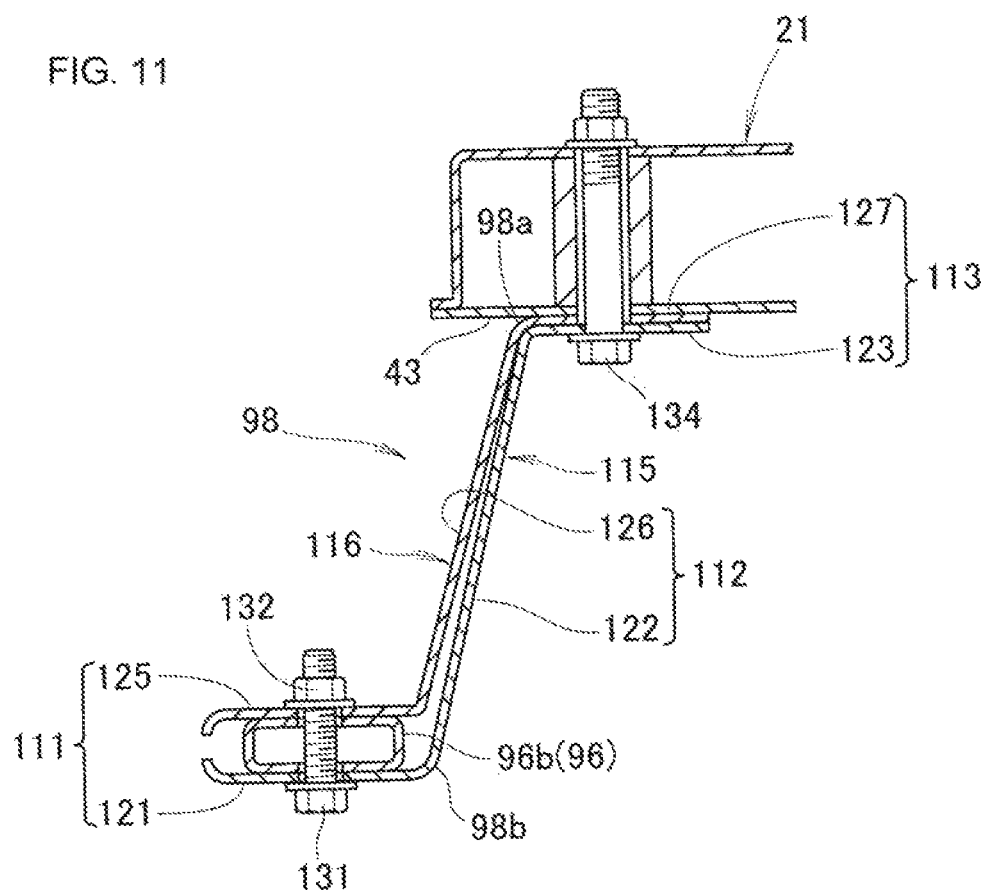
FIG. 11 is a XI-XI cross sectional view of FIG. 9.

As illustrated in FIG. 10 and FIG. 11, the connecting member 98 includes a brace connecting portion 111 which is arranged to connect the rear end portion 96b of the floor brae 96 with the front end portion 97b of the rear brace 97, a leg portion 112 which is raised upward from the brace connecting portion 111, and the frame connecting portion 113 which extends outward in the vehicle width direction from the upper portion of the leg portion 112.

That is to say, the leg portion 112 is arranged between the brace connecting portion 111 and the frame connecting portion 113. In this state, the led portion 112 extends in the vertical direction.

Also, the connecting member 98 includes two members: a lower holding portion 115 and an upper holding portion 116. The lower holding portion 115 includes a member that supports the rear end portion 96b of the floor brace 96 and the front end portion 97b of the rear brace 97 from below. Also, the upper holding portion 116 includes a member that supports the rear end portion 96b of the floor brace 96 and the front end portion 97b of the rear brace 97 from above.

To be more specific, the lower holding portion 115 includes a lower brace connecting portion 121 which is arranged below the rear end portion 96b of the floor brace 96 and the front end portion 97b of the rear brace 97, an outer leg portion 122 which is raised upward from the outer surface of the lower brace connecting portion 121, and a lower frame connecting portion 123 which extends outward in the vehicle width direction from the upper portion of the outer leg portion 122.

The lower brace connecting portion 121, the outer leg portion 122 and the lower frame connecting portion 123 are bend into a crank-shape to form the lower holding portion 115.

The upper holding member 116 includes an upper brace connecting portion 125 which is arranged above the rear end portion 96b of the floor brace 96 and the front end portion 97b of the rear brace 97, an inner leg portion 126 which is raised upward from the outer surface of the upper brace connecting portion 125, and an upper frame connecting portion 127 which extends outward in the vehicle width direction from the upper portion of the inner leg portion 126.

The upper brace connecting portion 125, the inner leg portion 126 and the upper frame connecting portion 127 are bend into a crank-shape to form the upper holding portion 116.

The brace connecting portion 111 includes the lower brace connecting portion 121 and the upper brace connecting portion 125. Also, the leg portion 112 includes the outer leg portion 122 and the inner leg portion 126.

Further, the frame connecting portion 113 includes the lower frame connecting portion 123 and the upper frame connecting portion 127.

Figure 12:
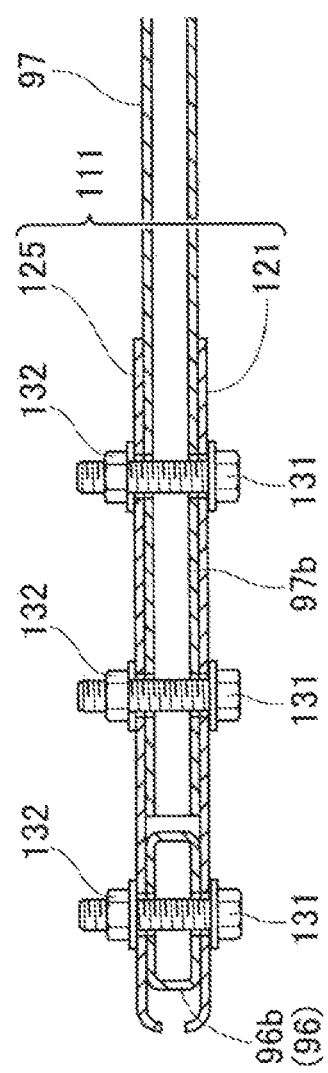
FIG. 12 is a XII-XII cross sectional view of FIG. 9.

As illustrated in FIG. 10 and FIG. 12, the rear end portion 96b of the floor brace 96 and the front end portion 97b of the rear brace 97 are clamped in the vertical direction by the upper brace connecting portion 125 and the lower brace connecting portion 121.

In this state, the lower brace connecting portion 121, the rear end portion 96b of the floor brace 96, and the upper brace connecting portion 125 are fastened by a bolt 131 and a nut 132. Also, the lower brace connecting portion 121, the front end portion 97b of the rear brace 97, and the upper brace connecting portion 125 are fastened by a plurality of the bolts 131 and the nut 132.

That is to say, the rear end portion 96b of the floor brace 97 and the front end portion 97b of the rear brace 97 are connected with one another while they are held by the brace connecting portion 111. Accordingly, the floor brace 96 and the rear brace 97 are rigidly supported by the brace connecting portion 111. By this, the rigidity of the floor brace 96 and the rear brace 97 will be enhanced.

Also, as the rear end portion 96b of the floor brace 96 and the front end portion 97b of the rear brace 97 are held by the brace connecting portion 111, the floor brace 96 and the rear brace 97 are connected with one another in a substantially V-shape when seen in plan view (see also FIG. 9).

As illustrated in FIG. 10 and FIG. 11, the leg portion 112 includes the outer leg portion 122 superimposed from the outer side in the vehicle width direction on the inner leg portion 126. Also, the frame connecting portion 113 which includes the upper frame connecting portion 127 superimposed on the lower frame connecting porting 123 is connected with the brace support portion 43 of the left rear frame 21 via a plurality of bolts 134.

Accordingly, the rear end portion 96b of the floor brace 96 and the front end portion 97b of the rear brace 97 are connected with the brace support portion 43 of the left rear frame 21 via the connecting member 98. By this, the floor brace 96 and the rear brace 97 are connected with the brace support portion 43 of the left rear frame 21 in a substantially V-shape when seen in plan view.

Also, the leg portion 112 is arranged between the brace connecting portion 111 and the frame connecting portion 113 in the vertical direction. Accordingly, the connecting member 98 forms a substantially crank-shape cross section. By this, a plurality of ridge line portions 98a and 98b are formed at the connecting member 98, thereby enhancing the rigidity of the connecting member 98.

Thus, by connecting the floor brace 96 and the rear brace 97 with the connecting member 98 having high rigidity, the rigidity of the floor brace 96 and the rear brace 97 will be secured.

Figure 13:
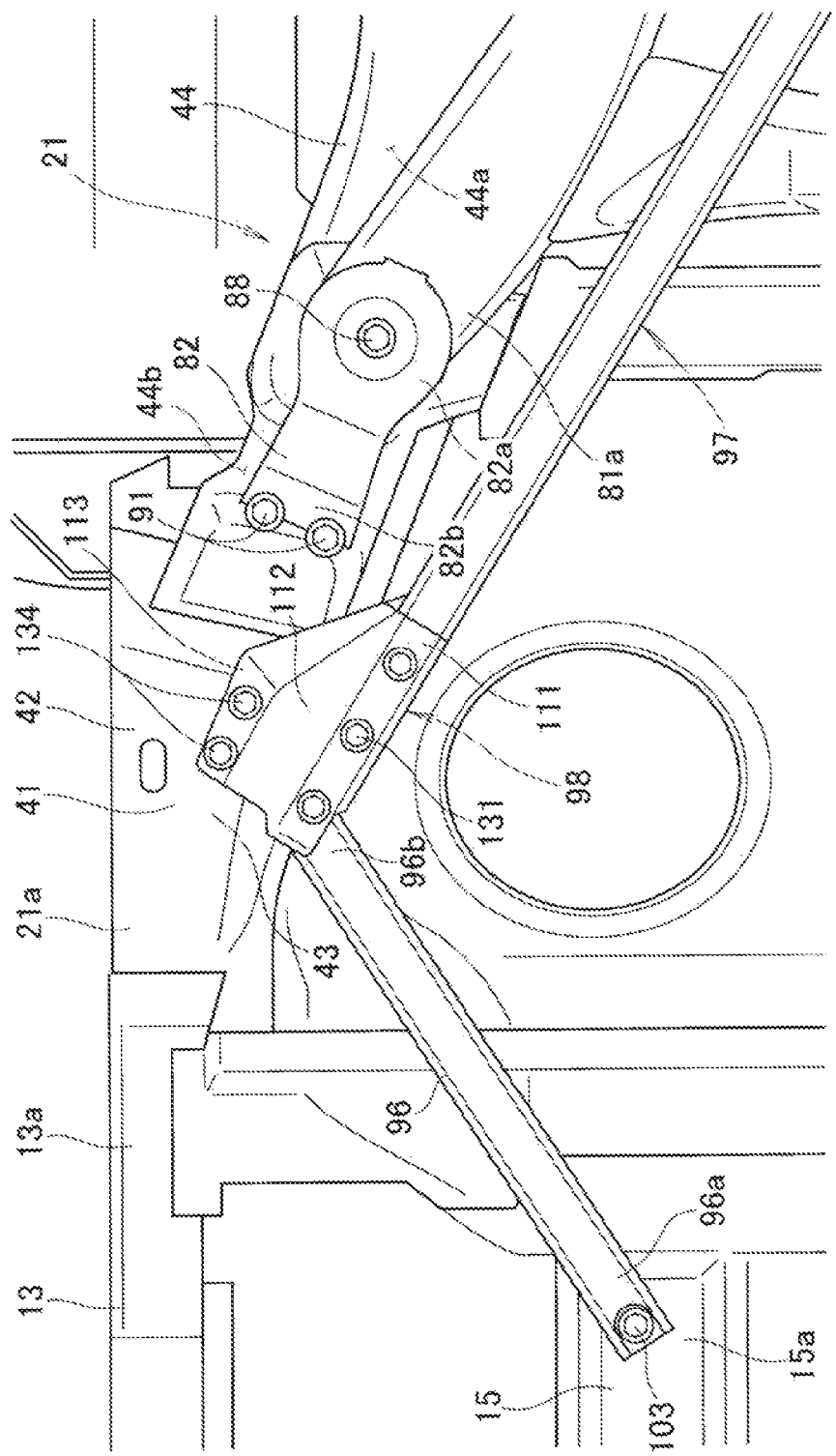
FIG. 13 is an enlarged view of a portion XIII of FIG. 4.

As illustrated in FIG. 11 and FIG. 13, the frame connecting portion 113 of the connecting member 98 is connected with the brace support portion 43 of the left rear frame 21 via the plurality of bolts 134. The brace support portion 43 is arranged at an area that is anterior to a front region 44b of the bottom portion 44a of the frame curved portion 44 and near the front region 44b. The front end portion 82b of the left attachment portion 82 is connected with the front region 44b via the plurality of bolts 91.

In other words, the brace support member 43 (i.e., connecting member 98) is connected near the left front attachment portion 82 of the sub frame 31.

Here, the left rear frame 21 is arranged at a lower portion of the vehicle body rear structure 10. Accordingly, when the floor brace 96 or the rear brace 97 were individually connected with the left rear frame 21 it would be time consuming to connect the floor brace 96 or the rear brace 97.

Thus, the brace connecting portion 111 and the frame connecting portion 113 are provided for the connecting member 98. Accordingly, this configuration enables the frame connecting portion 113 to be connected with the rear frame 21 while the floor brace 96 and the rear brace 97 are connected with the brace connecting portion 111.

By this, it becomes possible to simplify the manufacturing process compared to a process in which the floor brace 96 and the rear brace 97 are individually connected with the left rear frame 21.

Also, the leg portion 112 is arranged between the brace connecting portion 111 and the frame connecting portion 113. Further, the leg portion 112 is arranged in the vertical direction (see also FIG. 11). Accordingly, the vertical height of the brace connecting portion 111 and the frame connecting portion 113 can be differentiated by the leg portion 112.

That is to say, this configuration enables the vertical height of the floor brace 96 and the rear brace 97 to be differentiated with respect to the left rear frame 21. By this it becomes possible to enhance the degree of design freedom in terms of determining the vertical position of the floor brace 96 and the rear brace 97.

Further, the floor brace 96 extends toward the brace support portion 43 of the left rear frame 21 from the rear end portion 15a of the left floor frame 15, in which state, the rear end portion 96b of the floor brace 96 is connected with the brace support portion 43 via the connecting member 98.

That is to say, the left floor frame 15 is connected with the left rear frame 21 via the floor brace 96. Note that the left rear frame 21 includes a member having high rigidity forming the frame work of the vehicle body.

Thus, the left floor frame 15 is reinforced by the left rear frame 21. By this, the rigidity of the left floor frame 15 is improved, thereby improving the riding comfort for the passenger of the vehicle.

Next, an example in which a lifter (vehicle body lifting means) 141 is arranged for the vehicle body lifting portion 42 in the manufacturing process of the vehicle body to lift the vehicle body will be described with reference to FIG. 14.

Figure 14:
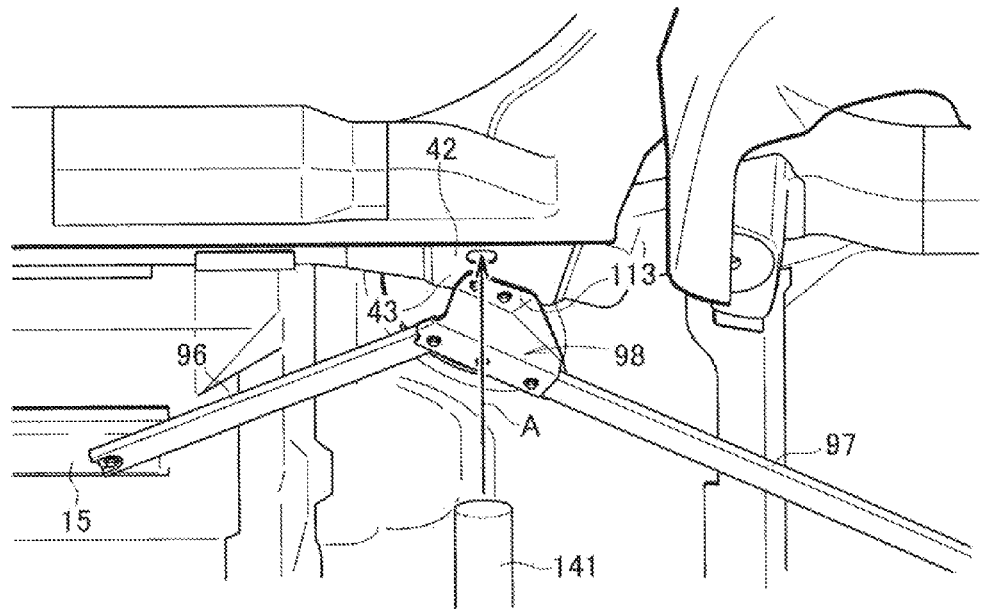
FIG. 14 is a diagram for explaining an example in which the vehicle body according to the embodiment is lifted during the manufacturing process.

As illustrated in FIG. 14, the brace support portion 43 is arranged inward in the vehicle width direction of the body lifting portion 42. The frame connecting portion 113 of the connecting member 98 is connected with the brace support portion 43. Accordingly, the frame connecting portion 113 (i.e., the connecting member 98) is arranged inward in the vehicle width direction of the vehicle lifting portion 42.

By this, it becomes possible to arrange the lifter 141 at the body lifting portion 42 in a direction indicated by an arrow A without interfering with the connecting member 98 in a process during the manufacturing process of the vehicle body after the floor brace 96 and the rear brace 97 are attached to the brace support portion 43 via the connecting member 98.

By arranging the lifter 141 to the vehicle body lifting portion 42 it becomes possible to lift the vehicle body Ve by applying a lifting force of the lifter 141 to the vehicle body portion 42, thereby optimizing the manufacturing process.

Next, an example in which an impact load F1 inputted to the vehicle body rear structure 10 from the rear of the vehicle body is supported by the left rear frame 21 will be described with reference to FIG. 15.

Figure 15:
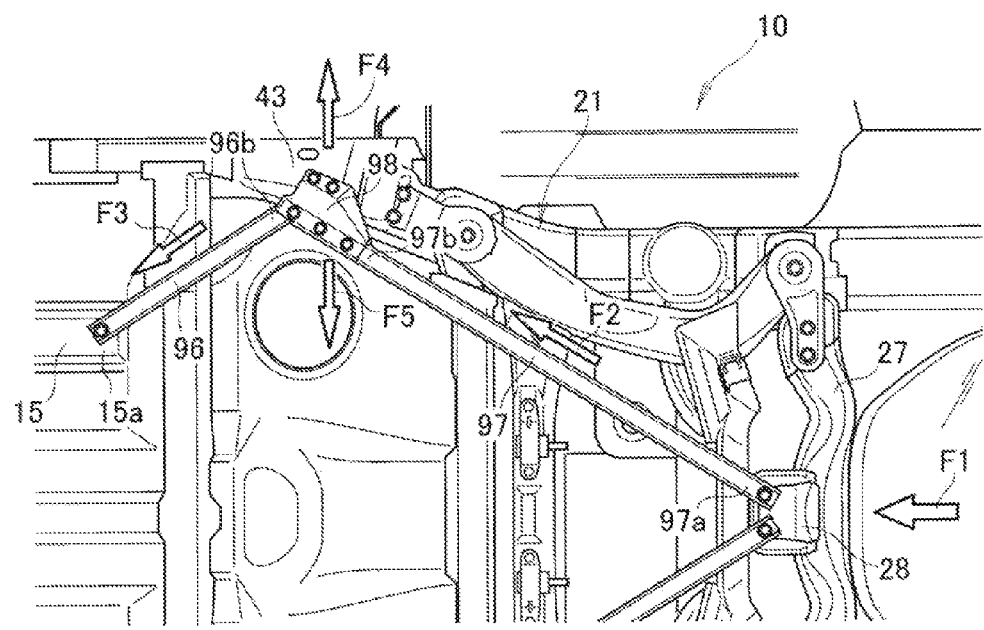
FIG. 15 is a diagram for explaining an example in which a left rear frame supports an impact load that is inputted to the vehicle body rear structure according to the embodiment from the rear of the vehicle body.

As illustrated in FIG. 15, the floor brace 96 extends rearward of the vehicle body and outward in the vehicle width direction in an inclined manner from the rear end portion 15a of the left floor frame 15. Also, the rear brace 97 extends rearward of the vehicle body and inward in the vehicle width direction in an inclined manner from the rear end portion 96b of the floor brace 96.

Further, the front end portion 97b of the rear brace 97 and the rear end portion 96b of the floor brace 96 are connected with the brace support portion 43 of the left rear frame 21 via the connecting member 98. In this state, the floor brace 96 and the rear brace 97 are arranged in a substantially V-shape when seen in plan view.

The impact load F1 is inputted to the vehicle body rear structure 10 from the rear of the vehicle body. The inputted impact load F1 is inputted as an impact load F2 to the rear end portion 97a of the rear brace 97 via the rear cross member 27 and the support bracket 28. The impact load F2 inputted to the rear end portion 97a of the rear brace 97 is inputted as an F3 to the floor brace 96 via the rear brace 97 and the connecting member 98.

Accordingly, a component force F4 directed outwardly in the vehicle width direction (i.e., an outwardly directed component force) is applied to the left rear frame 21 from the rear brace 97. Meanwhile, a component force F5 directed inwardly in the vehicle width direction (i.e., an inwardly directed component force) is applied to the left rear frame 21 from the floor brace 96.

Here, the outwardly directed component force F4 and the inwardly directed component force F5 are applied to the same area (i.e., the brace support portion 43) in the vehicle body direction of the left rear frame 21. Thus, a bending moment M1 applied to the left rear frame 21 by the outwardly directed component force F4 and a bending moment M2 applied to the left rear frame 21 by the inwardly directed component force F5 offset one another.

By this, it becomes possible to prevent a bending moment from being applied to the left rear frame 21, thereby securing the rigidity of the left rear frame 21 (i.e., the vehicle body rear structure 10) against the impact load F1.

Next, an example in which a load F6 transmitted to the left rear frame 21 from the left front attachment portion 82 of the sub frame 31 is supported by the floor brace 96 and the rear brace 97 will be described with reference to FIG. 16.

Figure 16:
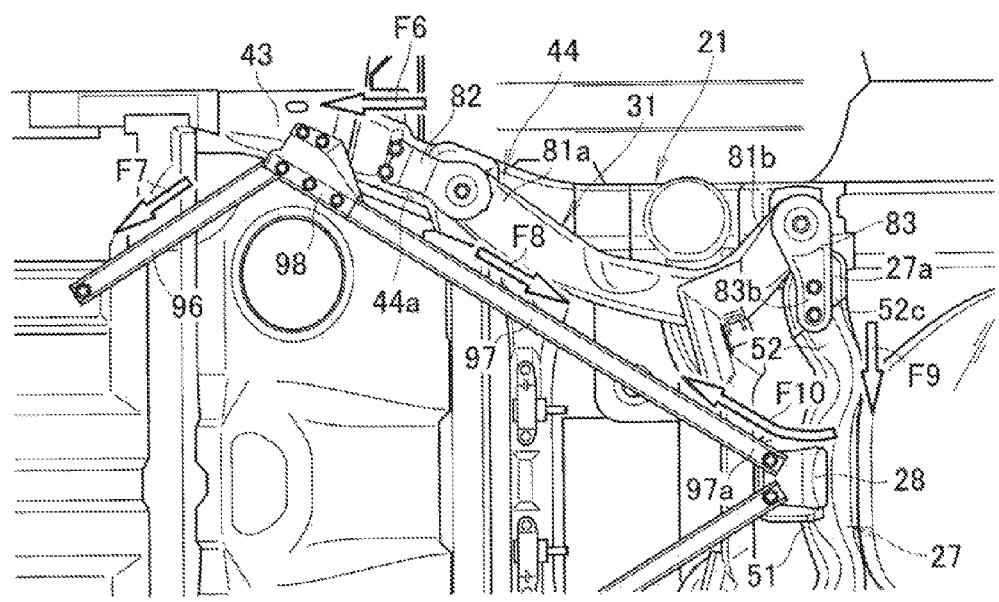
FIG. 16 is a diagram for explaining an example in which a load transmitted from a sub frame according to the embodiment to a left rear frame and a rear cross member is supported.

As illustrated in FIG. 16, the front end portion 81a and the left front attachment portion 82 of the sub frame 31 are connected with the bottom portion 44a of the frame curved portion 44. Also, the brace support portion 43 of the left rear frame 21 is arranged at an area of the left front attachment portion 82 of the sub frame 31 toward the front of the vehicle body. The connecting member 98 is connected with the brace support portion 43.

In this state, a load is inputted to the sub frame 31. The inputted load is inputted as a load F6 to the bottom portion 44a of the frame curved portion 44 from the left front attachment portion 82 of the sub frame 31. The inputted load F6 is transmitted to the connecting member 98.

The load F6 that is transmitted to the connecting member 98 is dispersed to the floor brace 96 as a load F7 and to the rear brace 97 as a load F8. The load F6 that is dispersed to the floor brace 96 is supported by the floor brace 96. Also, the load F8 that is dispersed to the rear brace 97 is supported by the rear brace 97.

Accordingly, the load F6 that is inputted to the bottom portion 44a of the frame curved portion 44 from the left front attachment portion 82 of the sub frame 31 is effectively supported by the floor brace 96 and the rear brace 97. By this, the rigidity of the vehicle body rear structure 10 with respect to the load F6 is enhanced by the floor brace 96 and the rear brace 97.

Next, an example in which a load F9 that is transmitted from the left rear attachment portion 83 of the sub frame 31 to the rear cross member 27 is supported by the rear brace 97 will be described with reference to FIG. 16.

As illustrated in FIG. 16, the support bracket 28 is arranged at the cross central portion 51 of the rear cross member 27, and the rear end portion 97a of the rear brace 97 is connected with the support bracket 28.

Also, the inner end portion 83b of the left rear attachment portion 83 of the sub frame 31 is connected with the bottom portion 52c (i.e., the left end portion 27a of the rear cross member 27) of the cross left side portion 52.

In this state, a load is inputted to the sub frame 31. The inputted load is inputted as the load F9 to the left end portion 27a of the rear cross member 27 from the left rear attachment portion 83 of the sub frame 31. The inputted load F9 is dispersed as a load F10 to the rear brace 97 via the support bracket 28.

Thus, the load F9 that is inputted to the rear cross member 27 from the left rear attachment portion 83 of the sub frame 31 is supported by the rear brace 97. By this, the rigidity of the vehicle body rear structure 10 with respect to the load F9 is enhanced by the rear brace 97.

Note that the rear vehicle body rear structure according to the present invention is not limited to the embodiment described above, and may be modified or improved in an appropriate manner.

For example, while the above described embodiment gave an example in which the support bracket 28 is arranged at the rear cross member 27 to include the rear support portion 28, the present invention is not limited thereto: the cross central portion 51 of the rear cross member 27 may include a rear support portion.

In such case, as the cross central portion 51 and the front step portion 61 form a closed cross section the rigidity of the cross central portion (i.e., the rear support portion) 51 is enhanced. By this, the rigidity of the rear brace 97 is enhanced by the cross central portion 51 having the rigidity in the same manner as the above embodiment, thereby securing the rigidity of the vehicle body rear structure 10.

Further, as the cross central portion 51 is used as the rear support portion, eliminating the need to arrange individual rear support portion, the vehicle body rear structure 10 having a reduced number of parts is provided.

Also, while the above described embodiment gave an example in which the floor brace 96 and the rear brace 97 include the substantially rectangular closed cross section shape, the present invention is not limited thereto: the floor brace 96 and the rear brace 97 may include a flat panel shape or the like.

Furthermore, the shape and configuration of the components according to the above described embodiment such as the vehicle, the vehicle rear structure, the front floor, the left and right floor frames, the left and right rear frames, the article storing floor, the rear cross member, the support bracket, the sub frame, the vehicle lifting portion, the left and right front attachment portions, the left and right rear attachment portions, the floor brace, the rear brace, the connecting member, the leg portion, the frame connecting portion, the lower brace connecting portion, and the upper brace connecting portion are not limited to those exemplary discussed above, and may be modified as appropriate.

For example, the present disclosure is particularly suitable for application to an automobile having a vehicle body rear structure in which a left rear frame and a right rear frame are arranged outward in the vehicle width direction and a brace is connected to each rear frame for reinforcement. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A vehicle body rear structure comprising:
   a left rear frame and a right rear frame disposed on sides of a vehicle body, respectively, and extending in a front and back direction of the vehicle body;
   a front floor disposed frontward of each of the left and right rear frames;
   a rear support portion disposed rearward of the front floor and between the left rear frame and the right rear frame;
   a left floor brace and a right floor brace each having a front end portion connected to the front floor, and each extending rearward of the vehicle body in an inclined manner outwardly in a vehicle width direction;

a left rear brace extending rearward of the vehicle body and inward in the vehicle width direction in an inclined manner from a rear end portion of the left floor brace, and having a rear end portion connected with the rear support portion;
a right rear brace extending rearward of the vehicle body and inward in the vehicle width direction in an inclined manner from a rear end portion of the right floor brace, and having a rear end portion connected with the rear support portion,
wherein a front end portion of the left rear brace is connected with the rear end portion of the left floor brace directly or via a left connecting member such that the left floor brace and the left rear brace are connected to make a substantially V-shape in plan view,
wherein a front end portion of the right rear brace is connected with the rear end portion of the right floor brace directly or via a right connecting member such that the right floor brace and the right rear brace are connected to make a substantially V-shape in plan view,
wherein vehicle body rear structure further comprises a left floor frame and a right floor frame each disposed to a lower surface of the front floor to make a closed cross section with the front floor, and each extending in the front and back direction of the vehicle body,
wherein the front end portion of the left floor brace is connected with the front floor and the left floor frame, and
the front end portion of the right floor brace is connected with the front floor and the right floor frame.

2. The vehicle body rear structure according to claim 1, wherein the rear support portion includes a closed cross section.

3. The vehicle body rear structure according to claim 1, wherein the left connecting member includes a brace connecting portion configured to connect the left floor brace with the left rear brace to make the substantially V-shape in plan view, and a frame connecting portion connected with the left rear frame, and
wherein the right connecting member includes a brace connecting portion configured to connect the right floor brace with the right rear brace to make the substantially V-shape in plan view, and a frame connecting portion connected with the right rear frame.

4. The vehicle body rear structure according to claim 3, wherein each of the left and right connecting members further includes a leg portion provided between the brace connecting portion and the frame connecting portion, and extending in a vertical direction.

5. The vehicle body rear structure according to claim 3, wherein
the brace connecting portion of the left connecting member includes an upper brace connecting portion disposed above the left floor brace and the left rear brace, and a lower brace connecting portion disposed below the left floor brace and the left rear brace, and
the brace connecting portion of the left connecting member connects the left floor brace and the left rear brace by clamping the left floor brace and the left rear brace with the upper brace connecting portion and the lower brace connecting portion.

6. The vehicle body rear structure according to claim 1, further comprising a sub frame having a front attachment portion and a rear attachment portion attached to a bottom portion of the left rear frame, and
the left connecting member is disposed in the vicinity of the front attachment portion of the sub frame.

7. The vehicle body rear structure according to claim 6, further comprising a rear cross member connected with the rear attachment portion of the sub frame, and extending in the vehicle width direction, and
an article storing floor connected with the rear cross member at a central portion of the rear cross member in the vehicle width direction,
wherein the rear support portion is constituted by the rear cross member or a support bracket provided to the rear cross member.

8. The vehicle body rear structure according to claim 3, wherein
the left rear frame includes at a bottom portion thereof a vehicle lifting portion configured to support a lifting force applied to the vehicle body, and
the frame connecting portion of the left connecting member is disposed inward of the vehicle lifting portion in the vehicle width direction.

9. The vehicle body rear structure according to claim 7, wherein an end portion of the rear attachment portion of the sub frame extends inward in the vehicle width direction along an extending direction of the rear cross member.

10. The vehicle body rear structure according to claim 1, wherein the rear support portion is disposed at a substantially center position of the vehicle body in the vehicle width direction.

11. The vehicle body rear structure according to claim 6, wherein the left connecting member is disposed in front of the front attachment portion of the sub frame.

12. A vehicle body rear structure comprising:
a left rear frame and a right rear frame disposed on sides of a vehicle body, respectively, and extending in a front and back direction of the vehicle body;
a front floor disposed frontward of each of the left and right rear frames;
a rear support portion disposed rearward of the front floor and between the left rear frame and the right rear frame;
a left floor brace and a right floor brace each having a front end portion connected to the front floor, and each extending rearward of the vehicle body in an inclined manner outwardly in a vehicle width direction;
a left rear brace extending rearward of the vehicle body and inward in the vehicle width direction in an inclined manner from a rear end portion of the left floor brace, and having a rear end portion connected with the rear support portion;
a right rear brace extending rearward of the vehicle body and inward in the vehicle width direction in an inclined manner from a rear end portion of the right floor brace, and having a rear end portion connected with the rear support portion,
wherein a front end portion of the left rear brace is connected with the rear end portion of the left floor brace directly or via a left connecting member such that the left floor brace and the left rear brace are connected to make a substantially V-shape in plan view,
wherein a front end portion of the right rear brace is connected with the rear end portion of the right floor brace directly or via a right connecting member such that the right floor brace and the right rear brace are connected to make a substantially V-shape in plan view,
wherein the left connecting member includes a brace connecting portion configured to connect the left floor brace with the left rear brace to make the substantially V-shape in plan view, and a frame connecting portion connected with the left rear frame, and wherein the right connecting member includes a brace connecting portion configured to connect the right floor brace with the right rear brace to make the substantially V-shape in plan view, and a frame connecting portion connected with the right rear frame.

13. The vehicle body rear structure according to claim 12, wherein each of the left and right connecting members further includes a leg portion provided between the brace connecting portion and the frame connecting portion, and extending in a vertical direction.

14. The vehicle body rear structure according to claim 12, wherein
the brace connecting portion of the left connecting member includes an upper brace connecting portion disposed above the left floor brace and the left rear brace, and a lower brace connecting portion disposed below the left floor brace and the left rear brace, and
the brace connecting portion of the left connecting member connects the left floor brace and the left rear brace by clamping the left floor brace and the left rear brace with the upper brace connecting portion and the lower brace connecting portion.

15. The vehicle body rear structure according to claim 12, wherein
the left rear frame includes at a bottom portion thereof a vehicle lifting portion configured to support a lifting force applied to the vehicle body, and
the frame connecting portion of the left connecting member is disposed inward of the vehicle lifting portion in the vehicle width direction.

16. A vehicle body rear structure comprising:
a left rear frame and a right rear frame disposed on sides of a vehicle body, respectively, and extending in a front and back direction of the vehicle body;
a front floor disposed frontward of each of the left and right rear frames;
a rear support portion disposed rearward of the front floor and between the left rear frame and the right rear frame;
a left floor brace and a right floor brace each having a front end portion connected to the front floor, and each extending rearward of the vehicle body in an inclined manner outwardly in a vehicle width direction;
a left rear brace extending rearward of the vehicle body and inward in the vehicle width direction in an inclined manner from a rear end portion of the left floor brace, and having a rear end portion connected with the rear support portion;
a right rear brace extending rearward of the vehicle body and inward in the vehicle width direction in an inclined manner from a rear end portion of the right floor brace, and having a rear end portion connected with the rear support portion,
wherein a front end portion of the left rear brace is connected with the rear end portion of the left floor brace directly or via a left connecting member such that the left floor brace and the left rear brace are connected to make a substantially V-shape in plan view,
wherein a front end portion of the right rear brace is connected with the rear end portion of the right floor brace directly or via a right connecting member such that the right floor brace and the right rear brace are connected to make a substantially V-shape in plan view,
wherein the vehicle body rear structure further comprises a sub frame having a front attachment portion and a rear attachment portion attached to a bottom portion of the left rear frame, and
the left connecting member is disposed in the vicinity of the front attachment portion of the sub frame.

17. The vehicle body rear structure according to claim 16, further comprising a rear cross member connected with the rear attachment portion of the sub frame, and extending in the vehicle width direction, and
an article storing floor connected with the rear cross member at a central portion of the rear cross member in the vehicle width direction,
wherein the rear support portion is constituted by the rear cross member or a support bracket provided to the rear cross member.

18. The vehicle body rear structure according to claim 17, wherein an end portion of the rear attachment portion of the sub frame extends inward in the vehicle width direction along an extending direction of the rear cross member.

19. The vehicle body rear structure according to claim 16, wherein the left connecting member is disposed in front of the front attachment portion of the sub frame.

* * * * *